US009237465B1

(12) United States Patent
Tanner et al.

(10) Patent No.: US 9,237,465 B1
(45) Date of Patent: Jan. 12, 2016

(54) SYSTEMS, APPARATUS AND METHODS FOR CONSUMER TESTING OF AN NFC-ENABLED MOBILE DEVICE

(71) Applicant: MasterCard International Incorporated, Purchase, NY (US)

(72) Inventors: Colin Tanner, Middlesex (GB); John Mwangi, White Plains, NY (US); Kuljot Singh Anand, White Plains, NY (US)

(73) Assignee: MasterCard International Incorporated, Purchase, NY (US)

( * ) Notice: Subject to any disclaimer, the term of this patent is extended or adjusted under 35 U.S.C. 154(b) by 8 days.

(21) Appl. No.: 14/325,904

(22) Filed: Jul. 8, 2014

(51) Int. Cl.
| | |
|---|---|
| *H04W 24/04* | (2009.01) |
| *H04B 5/00* | (2006.01) |
| *G06Q 20/32* | (2012.01) |
| *H04W 4/00* | (2009.01) |
| *H04M 1/725* | (2006.01) |
| *H04W 88/06* | (2009.01) |

(52) U.S. Cl.
CPC ........... *H04W 24/04* (2013.01); *G06Q 20/3278* (2013.01); *H04B 5/0031* (2013.01); *H04M 1/7253* (2013.01); *H04M 1/72561* (2013.01); *H04W 4/001* (2013.01); *H04W 4/008* (2013.01); *H04W 88/06* (2013.01)

(58) Field of Classification Search
CPC ..... H04W 24/04; H04W 4/001; H04W 4/008; H04W 88/06; G06Q 20/3278; H04B 5/0031
USPC ................................................. 235/375, 380
See application file for complete search history.

(56) References Cited

U.S. PATENT DOCUMENTS

| | | | | |
|---|---|---|---|---|
| 6,289,464 | B1 * | 9/2001 | Wecker et al. | 713/300 |
| 7,321,766 | B2 * | 1/2008 | Liu et al. | 455/425 |
| 2004/0209610 | A1 * | 10/2004 | Adwankar et al. | 455/419 |
| 2005/0234778 | A1 * | 10/2005 | Sperduti et al. | 705/22 |
| 2005/0283285 | A1 * | 12/2005 | Ying | 701/29 |
| 2006/0211415 | A1 * | 9/2006 | Cassett et al. | 455/423 |
| 2008/0287117 | A1 * | 11/2008 | Olgaard et al. | 455/423 |
| 2011/0242983 | A1 * | 10/2011 | Saito | 370/241 |
| 2012/0079100 | A1 * | 3/2012 | McIntyre et al. | 709/224 |
| 2012/0217971 | A1 * | 8/2012 | Deluca | 324/426 |
| 2014/0374475 | A1 * | 12/2014 | Kallfelz et al. | 235/375 |
| 2015/0236799 | A1 * | 8/2015 | Lee | 455/425 |

FOREIGN PATENT DOCUMENTS

| | | | | |
|---|---|---|---|---|
| EP | 2645588 A1 * | 10/2013 | ............... | H04B 5/00 |
| WO | WO 2010043646 A1 * | 4/2010 | ............. | G01R 31/00 |

* cited by examiner

*Primary Examiner* — Paultep Savusdiphol
(74) *Attorney, Agent, or Firm* — Buckley, Maschoff & Talwalkar LLC

(57) ABSTRACT

Near-Field Communication (NFC) test systems, apparatus and processes enable consumers to thoroughly and easily test the NFC circuitry and short range communications software of their mobile devices. In an embodiment, a processor of a consumer's mobile device receives input to initialize an NFC test application and displays a prompt on a display screen for the consumer to position his or her mobile device to communicate with an NFC-enabled device. When the processor receives input indicating a correct communication position, a shared identity is exchanged with the NFC-enabled device and transmitted to a central server computer. Next, the processor receives a plurality of NFC test instructions, communicates in a transaction mode of operation and then in a terminal mode of operation with the NFC-enabled device, and transmits NFC test data to the central server computer. In some embodiments, the processor receives NFC test results from the central server computer and displays an indication of the NFC test results on a display screen.

30 Claims, 8 Drawing Sheets

SYSTEMS, APPARATUS AND METHODS FOR CONSUMER TESTING OF AN NFC-ENABLED MOBILE DEVICE

FIELD OF THE DISCLOSURE

In general, systems, apparatus and methods are described that facilitate testing by a consumer of the near-field communications (NFC) circuitry of his or her mobile device.

BACKGROUND

Payment cards such as credit cards, debit cards and/or prepaid cards are ubiquitous and have been used by consumers for decades. Such cards typically include a magnetic stripe which stores the relevant account number and other data. To initiate a typical purchase transaction with such a card, the card is swiped through a magnetic stripe reader that is part of a point-of-sale (POS) terminal and the reader reads the account number and other data from the magnetic stripe. The account number is then used to route a transaction authorization request that is initiated by the POS terminal. The authorization request is typically routed from the merchant's acquiring financial institution (the "acquirer") to a server computer operated by or on behalf of the issuer financial institution that issued the payment account (the "issuer"), and the issuer's server computer provides a response. If the authorization response indicates that the issuer authorized the transaction, the transaction is consummated at the POS terminal.

Payment cards have been developed that allow the account number to be automatically read from the payment card by radio frequency communications. In particular, a "proximity reader" which, for example, is incorporated with the POS terminal, is configured to read the account number and/or other transaction information from the payment card. Such payment cards are often referred to as "proximity payment cards" or "contactless payment cards", and conventionally include a radio frequency identification (RFID) integrated circuit (IC, often referred to as a "chip") embedded in the payment card body. A suitable antenna is also embedded in the payment card body and is connected to the RFID chip to allow the chip to receive and transmit data by RF communication via the antenna. In typical arrangements, the RFID chip is powered from an interrogation signal transmitted by the proximity reader and received by the payment card antenna. In some embodiments, the payment card account number and other information may be uploaded from the IC payment card to the POS terminal during a purchase transaction. Authorization and clearing may then proceed in substantially the same manner as for a transaction initiated with a magnetic stripe payment card (putting aside additional security measures that may be implemented by using the processing capabilities of the IC payment card). An example of a contactless payment card standard is the "PayPass™" payment card system established by MasterCard International Incorporated, the assignee hereof. Wireless exchanges of information via NFC (Near Field Communication) have been developed for contactless or proximity payment applications.

The capabilities of a contactless payment card have been incorporated into a mobile device, such as a mobile telephone or smartphone, which turns that mobile device into a contactless payment device or payment-enabled mobile device. Since NFC technology complements many popular consumer level wireless technologies by utilizing key elements in existing standards for contactless card technology (for example, ISO/IEC 14443 A&B and JIS-X 6319-4), NFC-enabled mobile devices, such as NFC-enabled Smartphones, are manufactured and are compatible with existing contactless card infrastructure. Such an NFC-enabled mobile devices enables consumers to utilize one device across different systems (for example, as a mobile telephone, as a contactless payment device, and as a contactless identification device which can be used to gain access to buildings and/or to access transportation services and the like). In order to utilize an NFC-enabled mobile device as a contactless payment device, a payment card account number and other account or device-specific information is loaded into the mobile device by a process typically referred to as "personalization." Personalization of the mobile device may occur in an over the air (OTA) personalization process. Persons skilled in the art understand that "personalization" refers to the process by which consumer or user- and/or account-specific information is loaded into and/or otherwise applied to a payment-enabled mobile device. The account-specific information may include a consumer identifier, a payment card account number associated with a payment card account, and other consumer financial account information that may be provided by an issuer financial institution (FI) computer to the mobile device and loaded into a secure memory.

Mobile devices, such as mobile telephones, are manufactured and distributed by the mobile handset industry independently from the distribution channels typically utilized by the financial services industry. Consequently, the NFC functionality of the payment application running on a mobile device cannot be readily subjected to the same kind of testing that contactless payment cards typically undergo. Therefore, if a problem is reported by a consumer after purchase of a mobile telephone, logistical problems arise with regard to transporting a mobile telephone/contactless payment device to a test facility for troubleshooting. In addition, mobile telephones are expensive pieces of equipment and cannot just be replaced with a new device upon request by a consumer.

Many reasons can be provided to explain why a payment-enabled mobile device (for example, a mobile telephone or smartphone that has been personalized so as to be capable of engaging in purchase transactions) does not work correctly or is non-functional when presented at a reader device or proximity reader, for example, in a retail store. Moreover, although mobile telephone sales representatives in retail stores have experience troubleshooting radio frequency problems (related to making wireless telephone calls), they typically have little or no experience with NFC problems that may occur (related to making purchase transactions). Thus, the first assumption that the consumer (owner of the mobile device) typically makes is that the payment hardware (the NFC circuitry) or the payment software of the mobile device is defective. Since it is not practical for the consumer to return his or her mobile device to a repair facility or to ship it back to the device supplier, the consumer typically seeks support from the mobile device supplier and/or manufacturer.

As the NFC technology in the consumer's mobile device represents only short range communication functionality, the consumer must be physically present at a payment terminal (such as a cash register or other point-of-sale (POS) device) in order to test the NFC functionality of the mobile device. If the consumer is no longer in a merchant's retail store then he or she cannot use the mobile device to attempt to make another purchase (or a further purchase) to retry and/or test the NFC circuitry and/or payment software. Moreover, it may be difficult for the consumer to remember, and therefore follow, any directions provided on a website, or provided verbally via telephone from a customer service representative of the mobile device supplier at their next visit to a Merchant retail store location, at which the consumer can attempt to again use their mobile device at a payment terminal. Thus, consumers may be directed to ship the mobile device to a testing facility, which may be at the manufacturer's or device supplier's expense. In some cases, the consumer is provided with a replacement mobile device. In addition to the shipping costs and mobile device replacement costs, additional costs may be incurred by the mobile device manufacturer or distributor (such as a mobile phone retailer), such as costs associated with employing test personnel. In addition, the consumer who purchased the mobile device with NFC circuitry (such as an NFC-enabled mobile telephone) may be unhappy and/or dissatisfied because he or she may be left without a functioning mobile device for some period of time (until a replacement arrives), which may result in the loss of that person as a customer.

The inventors therefore recognized that an opportunity exists for providing simple, cost effective and accurate systems and/or processes that can be utilized by consumers to test the functionality of the short range communications hardware (for example, NFC circuitry or other type of contactless communications circuitry) of their mobile devices.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and exemplary embodiments and which are not necessarily drawn to scale, wherein.

DETAILED DESCRIPTION

Figure 1:
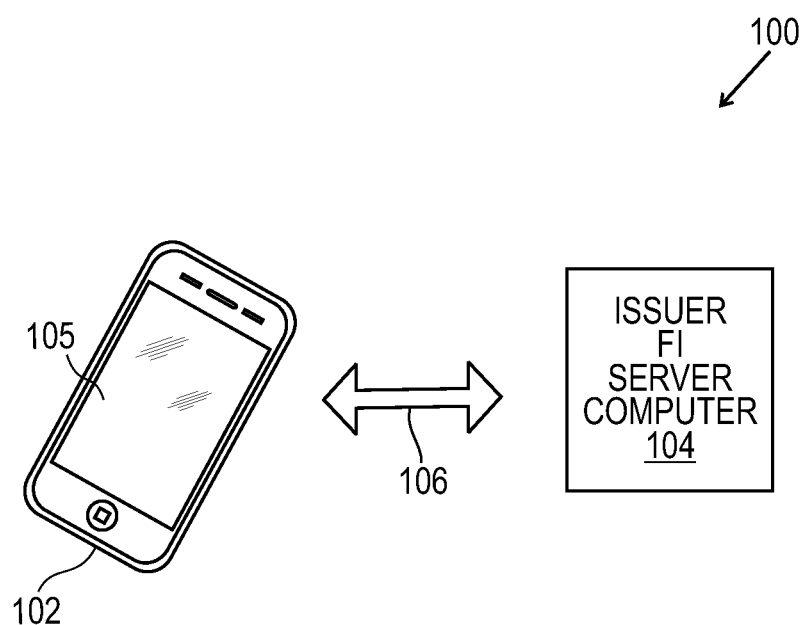
FIG. 1 is a simplified block diagram schematically illustrating a process for conducting over the air (OTA) personalization of a payment-enabled mobile device.

Disclosed herein are NFC test systems, apparatus and processes that enable consumers to thoroughly and easily test the NFC circuitry and short range communications software of their mobile devices. Consumer mobile devices that can incorporate NFC circuitry include, but are not limited to, mobile telephones (including Smartphones), personal digital assistants (PDAs), tablet computers, digital music players, laptop computers, key fobs, wristwatches, wristbands, and stickers. The NFC circuitry incorporated into such consumer mobile devices may be capable of performing like contactless payment cards in order to facilitate contactless purchase transactions, and/or may be utilized for other short-range communications applications such as to gain access to a building or to gain entry to a public transportation terminal Such NFC-enabled consumer mobile devices may therefore come in many varied sizes and shapes, and may include different types of operating systems.

In some embodiments of the NFC testing methods disclosed herein, a consumer initializes or runs an NFC test application that has been pre-loaded or downloaded onto his or her mobile device. Such an NFC test application may be downloaded to a memory component of the mobile device from a central server computer operated by, for example, a mobile device supplier or distributor. The NFC test application may also be available from an Application Store, which may be operated by a third party. In addition, in some implementations, the consumer may have access to a website that contains self-help instructions and/or a 2D or 3D barcode which can be read by an integrated camera of the consumer's mobile device and that, once read, initiates the downloading of the NFC test application to the consumer's mobile device (or initiates running of the NFC test application).

In embodiments described herein, the NFC test application permits the consumer to test the contactless communications functionality (such as the NFC circuitry) of the consumer's mobile device, however, a second NFC-enabled device running the same (or compatible) NFC test application is required in order to run one or more of the NFC circuitry tests. Thus, the consumer must either find another person with an NFC-enabled mobile device capable of running the NFC test application, or find another entity (such as a merchant) having an NFC-enabled device or NFC test device which includes the NFC test application.

In some embodiments, once the NFC test application is initiated on the consumer's mobile device, a message or prompt is presented to the consumer on a display screen to position his or her mobile device in a particular manner for communication with the second NFC-enabled device. Once positioned, the consumer's mobile device exchanges a shared identity with the second NFC-enabled device, and that shared identity is transmitted to a central server. The central server then interfaces with and/or functions to control the NFC test applications of both the consumer's mobile device and the second NFC-enabled device. Under control of the central server, the NFC test application performs a plurality of NFC tests. For example, the consumer's mobile device is tested in a transaction mode of operation (which may be a payment enabled mode) with the second NFC-enabled device in a terminal device mode of operation, and then tested again (testing is repeated or re-testing occurs) after the central server switches the second NFC-enabled device to a transaction mode of operation and switches the consumer's mobile device to a terminal mode of operation.

After concluding the NFC testing, the consumer's mobile device may transmit the NFC test data to the central server and/or may display the NFC test data results on the mobile device display screen for review by the consumer. In some cases, the central server computer may receive the NFC test data and determine that the NFC circuitry is functioning correctly and that the payment application software is functioning correctly. In this case, the central server may transmit a message to be displayed on the consumer device display screen indicating that the NFC test results indicate that the NFC circuitry (and the payment application software) is functioning correctly. But if a problem has been detected based on the NFC test data, the central server may download one or more application programs or instructions to the consumer's mobile device to correct a hardware problem and/or to correct a software problem. In some other cases, wherein a serious NFC hardware problem or software problem was detected (which cannot be addressed by downloading a fix), the central server may transmit a message to be displayed on the consumer mobile device display screen instructing the consumer to return the consumer's mobile device to the device supplier or manufacturer for repair.

One of the applicants has also developed systems, apparatus and methods for easily, cost effectively, and accurately testing the validity and/or success of personalization of a user's payment-enabled mobile device. In particular, systems, apparatus and processes are disclosed in U.S. patent application Ser. No. 14/244,228, which was filed on Apr. 3, 2014, that verify that loading of a payment application has completed, that test to ensure that the payment application is functioning correctly, and that can reliably test the validity of a payment application upgrade process to ensure that it was successful and is functional before a previously loaded (and functional) payment application is deleted from a secure element of the user's payment-enabled mobile device. In addition, the systems and processes can detect errors and/or problems concerning the payment application loading process and/or payment application functionality during personalization, and in some cases can resolve such errors and/or problems automatically without the user even being aware of a problem or issue. The applicant has also developed systems, apparatus and methods for use by a consumer to test the functionality of the wireless communications hardware (such as NFC circuitry) in his or her mobile device. In particular, U.S. patent application Ser. No. 14/246,073, which was filed on Apr. 8, 2014, discloses NFC test platforms (which may include NFC tags) and NFC test platform processes for use by consumers to facilitate the testing of the NFC circuitry of their mobile devices. The systems, apparatus and processes described immediately above are complimentary to those presented herein, and thus the entirety of the disclosures of U.S. patent application Ser. No. 14/244,228 and U.S. patent application Ser. No. 14/246,073 are hereby incorporated by reference.

FIG. 1 is a simplified block diagram 100 schematically illustrating a conventional process for conducting OTA personalization of a payment-enabled (or NFC-enabled) mobile device, such as a mobile telephone 102 having a touchscreen display 105, so that a consumer or user can perform contactless purchase transactions using the consumer's mobile device. An issuer financial institution (FI) server computer 104 is operated by or on-behalf of an issuer FI of payment card accounts. The payment card issuer FI server computer 104 is the source of information that is loaded into the NFC-enabled mobile telephone 102 for the purpose of personalizing a secure element of an integrated circuit (IC) (not shown) of the mobile telephone. The arrow 106 schematically illustrates a communication channel by which the personalization information is transmitted from the payment card issuer FI server computer 104 to the consumers' NFC-enabled mobile telephone 102, and for use to transmit feedback information concerning progress of the personalization process (for example, any error messages that may occur) from the mobile telephone 102 to the issuer FI server computer 104. The communication channel 106 may also be used to exchange other forms of data or information.

Figure 2:
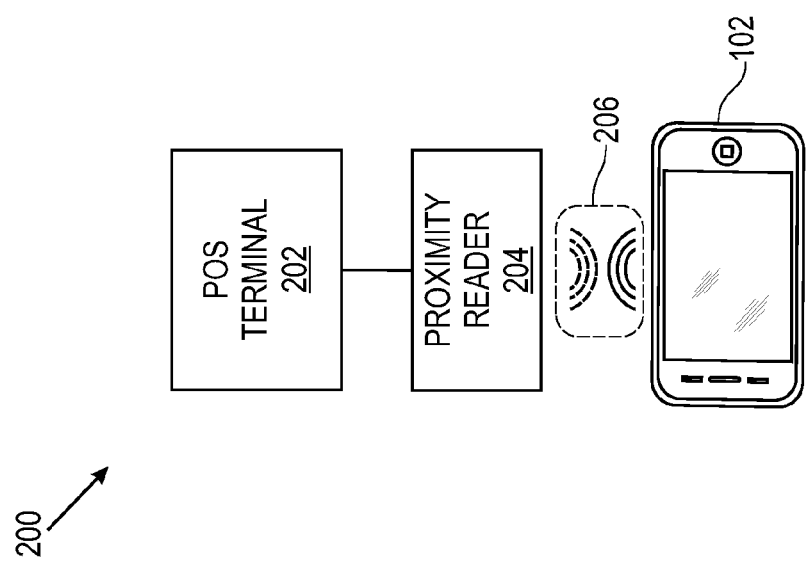
FIG. 2 is a schematic block diagram illustrating some communication aspects of a typical purchase transaction in which the payment-enabled mobile device of FIG. 1 is used.

FIG. 2 is a schematic block diagram 200 illustrating some communication aspects of a typical purchase transaction in which a payment-enabled mobile telephone 102 is used. A point of sale (POS) terminal 202 is operably connected to a contactless reader or radio-frequency (RF) proximity reader component 204. Wireless communication between the payment-enabled mobile telephone 102 and the contactless reader component 204 is indicated at 206. The wireless communication 206 may be conducted in accordance with one or more standard protocols, such as the "EMV Contactless" and/or NFC protocols, which are known to those skilled in the art. It should be noted that, in order for the proximity reader 204 to exchange data in a contactless manner with the consumer's mobile telephone 102, the consumer may have to present the mobile telephone 102 in a particular orientation to, and/or within a limited distance from, the proximity reader 204. Thus, if the consumer does not correctly position his or her mobile telephone, a data read failure may occur, resulting in failure of the purchase transaction. In such a case, the consumer may assume that the NFC circuitry of his or her mobile device is at fault, which is not true.

Figure 3:
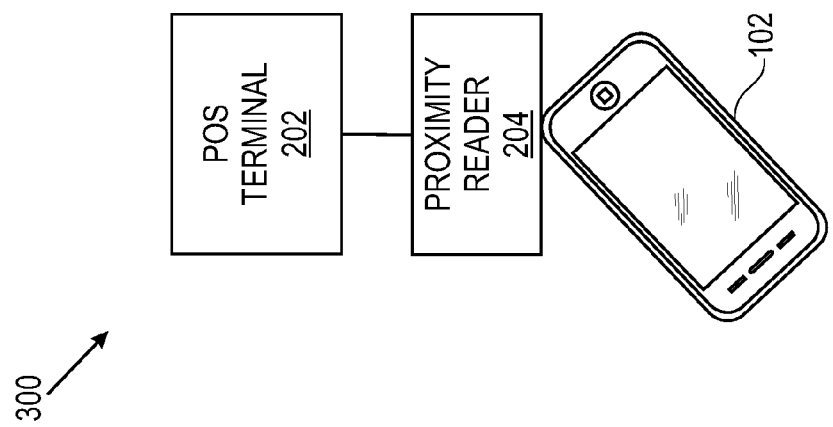
FIG. 3 is a schematic block diagram illustrating some physical aspects of a contactless or wireless purchase transaction.

FIG. 3 is a schematic block diagram 300 illustrating some physical aspects of a contactless or wireless purchase transaction. As in FIG. 2, the POS terminal 202 and its associated proximity reader component 204 are shown. The payment-enabled or NFC-enabled mobile telephone 102 is also shown near to or in proximity to the proximity reader component 204. In a common manner of initiating the wireless communication shown in FIG. 2, the user of the NFC-enabled mobile telephone 102 briefly taps it at a particular location on the proximity reader component 204. The exact location on the proximity reader component 204 at which the NFC-enabled mobile telephone 102 should be tapped may be indicated by a standard logo affixed to the proximity reader component 204, such as a "PayPass™" logo. In order to consummate a particular purchase transaction, one, two or more taps of the NFC-enabled mobile device 102 onto the proximity reader 204 may be required. The number of taps may depend upon the type or types of authorization process(es) being utilized and/or on other data, for example, the purchase transaction amount. Thus, mobile device manufacturers may include a payment processor/transceiver integrated circuit (IC) (which may be an NFC circuit) configured for contactless communications with a contactless reader device (proximity reader 204) which may be associated with a point of sale (POS) terminal 202 of a merchant. In some embodiments the mobile telephone, which may be a "Smartphone," includes conventional mobile telephone circuitry for making wireless calls along with IC payment circuitry and/or other hardware for providing NFC functionality so that the mobile telephone can be used as a contactless payment device. Again, it should be understood that the consumer may be required to tap a particular portion of the consumer's mobile telephone, such as the upper left-hand corner (as shown in FIG. 3), on a designated or particular location on the proximity reader component 204 in order to establish wireless communications. Failure to follow such methodology, for example, the consumer tapping the bottom right-hand corner on the proximity reader, or the consumer tapping his or her mobile telephone on an incorrect location on the proximity reader, would result in failure of the purchase transaction. In such cases, the consumer may assume that the NFC circuitry of his or her mobile device is at fault, which is not true.

Figure 4:
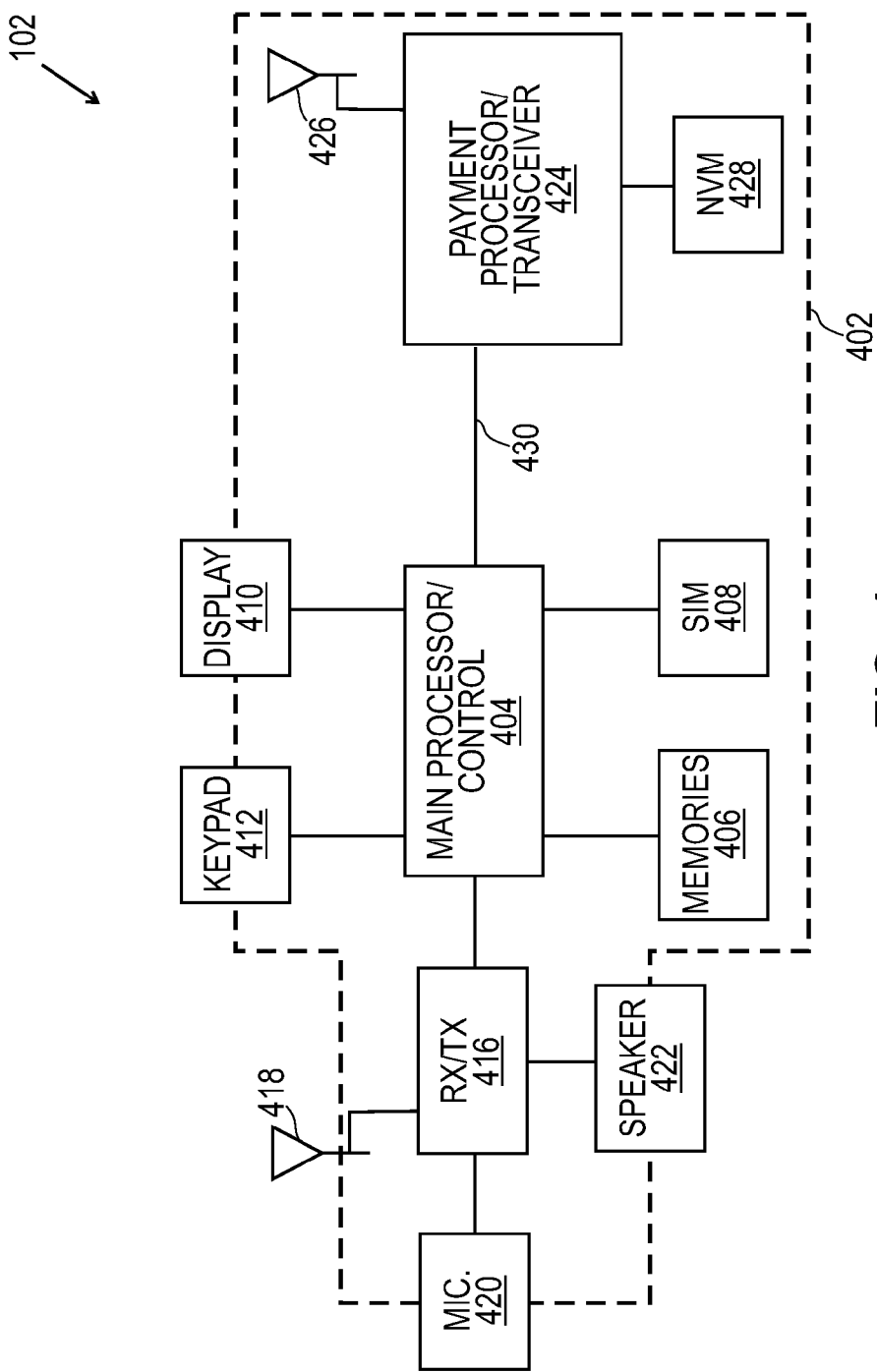
FIG. 4 is a block diagram representation of an embodiment of a payment-enabled mobile telephone in accordance with aspects of the disclosure.

FIG. 4 is a block diagram representation of an embodiment of a payment-enabled or NFC-enabled mobile telephone in accordance with aspects of the disclosure. The payment-enabled mobile telephone 102 may be conventional in its hardware aspects. For example, the mobile telephone may resemble, in most of its hardware aspects and many of its functions, a conventional Smartphone.

The mobile telephone 102 may include a conventional housing (indicated by dashed line 402 in FIG. 4) that contains and/or supports the electrical components, and the housing 402 may be shaped and sized to be comfortably held by a consumer. For example, the housing 402 may be designed to fit in the palm of the user's hand. The mobile telephone 102 further includes conventional main processor and/or control circuitry 404, for controlling the over-all operation of the mobile telephone. For example, the control circuitry 404 may include one or more conventional low-power processors that are specially designed and/or configured for functioning to send and receive wireless voice communications and text messages.

Other components of the mobile telephone 102, which are in communication with and/or controlled by the control circuitry 404, include one or more memory devices 406 (for example, program memory and/or working memory), a conventional subscriber identification module card (SIM card) 408, a keypad 412 for receiving user input, and a conventional display component 410 (which may be a touch screen) for displaying information to the user. In some embodiments, the keypad 412 may include, for example, a conventional 12-key telephone keypad, in addition to other buttons, switches and keys, such as a conventional rocker-switch/select key combination, soft keys, and send and end keys. But as is now frequently the case, instead of a standard keypad, a smartphone provides the functionality represented by the display 410 and keypad 412 in an integrated manner via a touch screen (which is not indicated in FIG. 4 apart from blocks 410 and 412). As is known, when a consumer wishes to enter text data by using a touchscreen, a smartphone will display a virtual keyboard on the touch screen display for use by the consumer.

The payment-enabled mobile telephone 102 also includes conventional receive/transmit circuitry 416 that is also in communication with and/or controlled by the processor and/or control circuitry 404. The receive/transmit circuitry 416 is coupled to an antenna 418 and provides the communication channel(s) by which the mobile telephone 102 communicates via a mobile telephone communication network operated by a mobile network operator (MNO) (not shown). The receive/transmit circuitry 416 may operate both to receive and transmit voice signals, in addition to performing data communication functions.

The payment-enabled mobile telephone 102 further includes a conventional microphone 420 operably connected to the receive/transmit circuitry 416, which is utilized to receive voice input from the user. A speaker 422 provides sound output to the user, and is also operably coupled to the receive/transmit circuitry 416.

In conventional fashion, the receive/transmit circuitry 416 operates to transmit, via the antenna 418, voice signals generated by the microphone 420, and operates to reproduce, via the loudspeaker 422, voice signals received via the antenna 418. The receive/transmit circuitry 416 may also handle transmission and reception of text messages (such as SMS messages and the like) and other data communications via the antenna 418.

The payment-enabled mobile telephone 102 may also include payment processor and/or transceiver circuitry 424 (which may be an IC) and a loop antenna 426 that is operably coupled to the payment circuitry 424. The payment circuitry 424 may include components that function to allow the payment-enabled mobile telephone 102 to operate as a contactless payment device and/or as a consumer identification device. Thus, in some embodiments the payment circuitry 424 includes one or more processors (not separately shown) and a memory (not separately shown) coupled to the processor(s) and that stores program instructions for controlling the processor(s). The payment circuitry 424 is in communication with the control circuitry 404 via a data communication connection or communication channel 430. But in some embodiments, the payment circuitry 424 and/or its processor(s) may be integrated with the main processor 404. Thus, in some implementations the functionality represented by the payment circuitry 424 may be largely implemented with a payment application program (not shown in FIG. 4) stored in a memory or storage device that controls a portion of the operations or functionality of the main processor 404. The control aspect of the payment circuitry 424 may also control a transceiver (also represented by block 424) which may handle short-distance wireless communications (such as NFC communications specified by the NFC protocol) via the antenna 426.

In accordance with conventional practices and some embodiments, the payment-enabled mobile telephone 102 may include a "secure element" (not separately shown), which may be incorporated with the payment circuit 424, the main processor 404 and/or the SIM card 408. Those skilled in the art know that such a secure element may include a small processor (e.g., a microprocessor) and volatile and/or non-volatile memory such as the non-volatile memory (NVM) 428, which is configured so as to be secure from tampering and/or unauthorized reprogramming by utilization of suitable security measures. The secure element may, for example, manage functions such as storage of the consumer's payment card account number, providing access to the payment card account number during a purchase transaction, and cryptographic processing. In addition, the secure element may store counter values and/or accumulator values that the payment-enabled mobile telephone 102 uses with respect to risk management activities.

Mobile device manufacturers typically test the circuitry or hardware of mobile devices, including the NFC communications circuitry, before such mobile devices leave the manufacturing facility. However, a consumer who purchases a particular mobile device may still encounter difficulties when attempting to utilize that mobile device as a contactless payment device (or a contactless identification device) for many reasons. For example, a particular consumer or mobile device owner may be handling his or her payment-enabled mobile device incorrectly when attempting to purchase an item such that the mobile device is prevented from communicating with a proximity reader, such as a merchant's contactless reader device, in order to utilize the payment functionality. In one example, the consumer may not be bringing the payment-enabled mobile device into close enough proximity with the merchant's reader device, and/or may be tapping his or her payment-enabled mobile device on an incorrect portion of the contactless reader. In another example, the consumer may have unknowingly and/or inadvertently disabled the payment functionality on his or her mobile device. But to the consumer, since his or her mobile device is otherwise operating correctly (for example, the mobile telephone is operable for making wireless calls and/or texting, or the consumer's digital music player is operable to download and play music), the problem appears to be that the mobile device payment hardware (for example, the NFC circuitry) or the payment software is not operating correctly, when in fact it is not the device hardware. Thus, the consumer assumes that the NFC communications circuitry or the payment software is faulty and/or is defective, and additionally may believe that he or she is entitled to a replacement and/or new mobile device. However, it is usually the case that an actual payment circuitry hardware problem and/or a contactless payment application software problem associated with any particular mobile device only occurs in a limited number of cases. Thus, the ability to troubleshoot or debug any such perceived problems and resolve them remotely, while the mobile device is still with the consumer and before the consumer ships the mobile device back to the manufacturer or distributor, is important. Consequently, many mobile device manufacturers and/or mobile device distributors provide websites that include information to help the consumer troubleshoot and/or debug such problems, with or without having to speak to another person. Contact information may also be provided to enable consumers and/or mobile device owners to speak to customer care personnel via their mobile device and/or via a landline. But these methods do not typically help resolve perceived mobile device hardware or software problems (such as NFC circuitry issues) that may occur, whether due to user error (i.e., the consumer is holding and/or utilizing his or her NFC-enabled mobile device in an incorrect manner) or to an actual faulty or inoperable NFC circuit.

Figure 5:
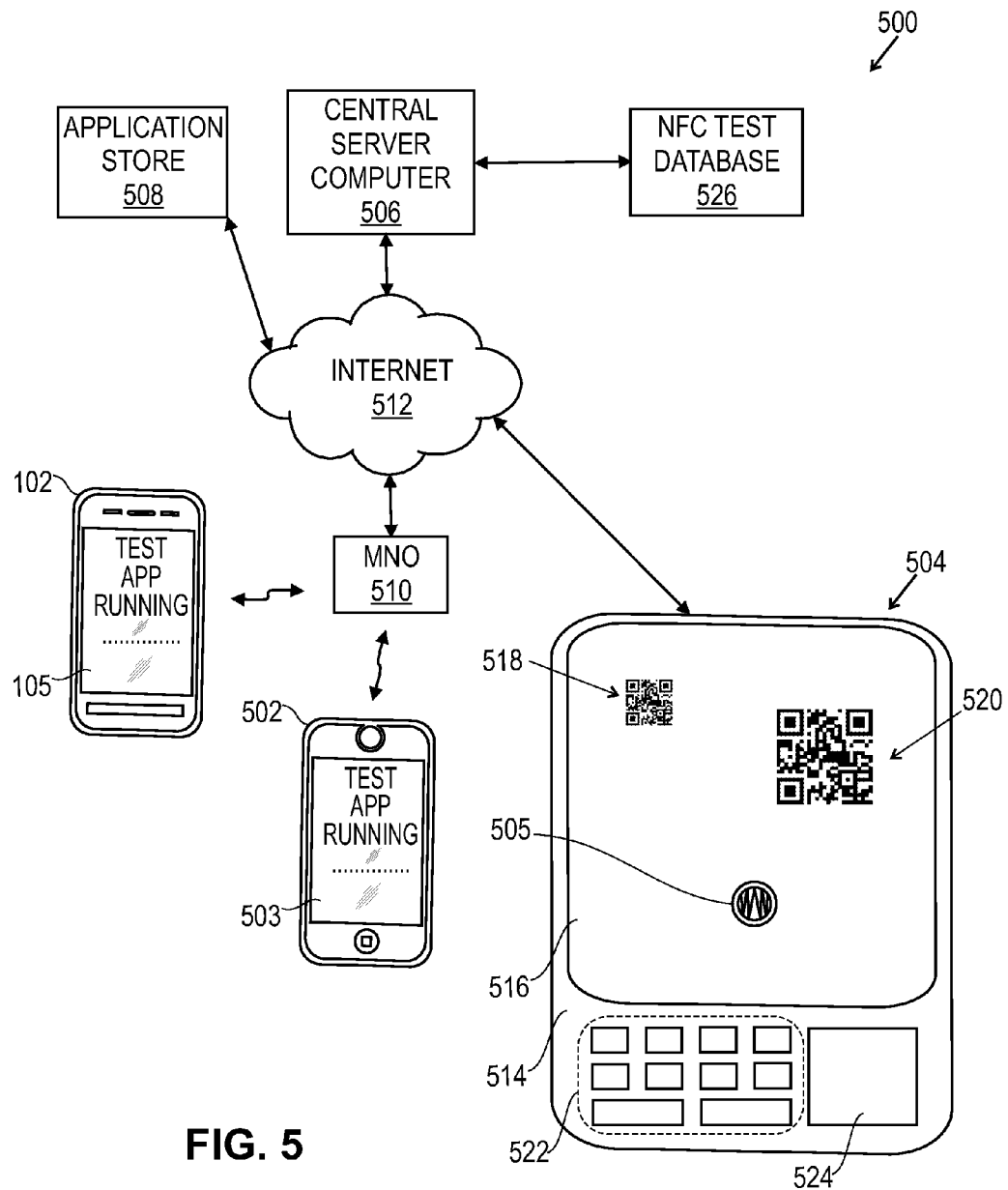
FIG. 5 is block diagram of an embodiment of an NFC test system including components configured to allow a consumer to test the NFC circuitry of the consumer's mobile device according to aspects of some embodiments of the disclosure.

FIG. 5 is block diagram of an embodiment of an NFC test system 500 according to some embodiments which includes components configured to allow a consumer to test the NFC circuitry of the consumer's mobile device 102. The NFC test system 500 may include the consumer's mobile device 102, a second NFC-enabled mobile device 502 (which may be owned and operated by another consumer or by a third party, such as a device supplier or a merchant), an NFC test device 504 (which may be owned and/or operated by a merchant), a central server computer 506, an Application Store 508, and an NFC test database 526 operably connected to the central server computer 506. The central server computer 506 may be owned and/or operated by a payment card system operator such as MasterCard International Incorporated, the assignee of the present application.

The consumer's mobile device 102, the second NFC-enabled mobile device 502, and/or the NFC test device 504 may also include an integrated camera (not shown), which may be used during the NFC circuitry testing process as explained herein. In some embodiments, an NFC test application is included with (has been pre-loaded onto) the consumer's mobile device 102. The second NFC-enabled mobile device 502 and the NFC test device 504 also have the NFC test application loaded thereon. In another implementation, a consumer may download the NFC test application from the central server computer 506 or from the Application Store 508 to the consumer's mobile device 102, or the NFC test application may be obtained from some other provider and loaded onto the consumer mobile device 102.

In accordance with embodiments described herein, when the NFC test application process is initiated, the consumer's mobile device 102 simultaneously communicates with the second NFC-enabled mobile device 502 and the central server computer 506 to start NFC circuitry testing. In particular, the consumer's mobile device 102 may communicate with the central server 506 via an MNO system 510 and via the Internet 512, while also communicating with the second NFC-enabled device 502 via the MNO system 510 in order to conduct NFC circuitry testing. In another implementation, the NFC test application facilitates communications between the consumer's mobile device 102 and the central server computer 506 and the NFC test device 504, which may be located, for example, at a merchant retail store. In either type of configuration, once communications between the three parties are established, an automated NFC test is conducted under the control of the central server 506, which may include running detailed diagnostic checks of the NFC circuitry of the consumer's mobile device 102.

Thus, a consumer who has reason to believe that the NFC circuitry of his or her mobile device is malfunctioning may endeavor to find a friend or associate who has a mobile device that can run the same NFC test application in order to conduct NFC circuitry testing. Accordingly, a device manufacturer or supplier may provide an NFC test website, which may be hosted by the central server computer 506. The NFC test website may include an "NFC test application device locator" program to aid consumers in finding a merchant retail location that includes an NFC test device 504.

It is contemplated that, in some embodiments an "NFC test person locater" application may be available, either from an NFC test website or from the Application Store 508, that permits a consumer (the mobile device owner) to find or locate one or more other persons (who may reside in the same general area as the consumer) who own an NFC-enabled mobile device and who have volunteered (or are otherwise willing) to help the consumer perform NFC testing of his or her mobile device 102. Such persons (NFC test volunteers) may opt-in to being placed on a list of those who own NFC-enabled devices and who are willing to help other consumers perform NFC testing on their mobile devices. In some implementations, the NFC test volunteers may earn NFC test "points" from device manufacturers and/or device suppliers for helping to test consumer's mobile devices, and such points may be redeemed by the NFC test volunteers to obtain a reward such as discount coupons or the like.

Referring again to FIG. 5, in some embodiments the NFC test device 504 includes a housing 514 that has a test area 516 that is sized to accommodate different types of consumer mobile devices, such as Smartphones and/or digital music players, that are to be placed nearby or thereon when NFC testing occurs. Accordingly, it should be understood that the NFC test device 504 is not limited to the configuration shown in FIG. 5, and could have a housing 514 that is not rectangular and that may be of any size or shape for accommodating consumer mobile devices to facilitate or otherwise provide for NFC testing. The NFC test device 504 may include one or more processors, a communications component, one or more sensors and a storage device (not shown) operable to perform NFC testing as described herein. For example, one or more sensors and/or NFC tags (not shown) may be included within the housing 514 which may or may not be visible to the consumer. The test area 516 may include one or more indicators 518 and 520 visible on the surface thereof, which will be explained below. In addition, the NFC test device 504 may include a keyboard or keypad 522 which may be used, for example, by a retail store employee to enter information that may be requested to initiate and/or to conduct NFC circuitry testing of a consumer's mobile device 102. A display screen 524 may also be provided which may display messages and/or prompts, for example, concerning placement of the consumer mobile device when NFC testing is initiated and/or is in progress. Moreover, the NFC test device 504 may include a camera 505 that may be located in the test area 516 or elsewhere, which may be utilized during testing, for example, to check the positioning and/or location of the consumer's mobile device 102 during the NFC testing process.

In some embodiment, the NFC test device 504 may be connected to or include an integrated printer (not shown) for use to output NFC test results to the consumer. The printed output results may be required when the consumer is instructed to ship his or her consumer mobile device to a device manufacturer for repair or replacement. In particular, a mobile device manufacture may mandate or require that consumers first follow the NFC test process and then second, when shipping an allegedly defective mobile device to the mobile device manufacturer, attach a printout of the test results (or a copy of the server log generated during NFC testing). When the printout of the NFC test results (or the server log) shows an NFC circuitry or software fault or problem, then the consumer does not have to pay shipping fees should a "fault not found" result occur when the consumer's mobile device is tested at the manufacturer's test facility. However, if the consumer does not include a printout of the NFC test results (or the server log), and no fault can be found at the manufacturer's test facility (i.e., the test facility could not find any problems with the NFC circuitry and/or the payment software) then the consumer would be liable for payment of the shipping fees incurred to ship the consumer's mobile device to and from the test facility. Thus, NFC diagnostics testing may be thought of as the first step before a consumer returns a mobile device (such as a Smartphone), or as a method for filtering-out "fault not found" issues. A person or consumer who does not complete the NFC testing process may therefore be asked to pay for the return shipping service costs if the device supplier's repair center does not find a fault.

In addition, in some embodiments of the NFC test device 504, different types of sensors and/or diagnostic functionality may be included within the housing 514 that are operable, as the process switches the consumer's mobile device into a payment terminal mode of operation, to check for accessories and/or foreign objects and/or other possible items that may be causing NFC communications problems. For example, the NFC test device 504 may include one or more sensors operable to confirm whether or not a metallic case has been added to the consumer's mobile device (which may inadvertently be blocking and/or interfering with NFC signals). In another example, the NFC test device 504 may include one or more sensors operable to confirm that an RFID sticker (or similar object) has not be added or adhered to the consumer's mobile device, which could be interfering with and/or blocking signals to and/or from the NFC circuitry of the consumer's mobile device. In yet another example, one or more of the sensors included in the NFC test device 504 may be operable to obtain data regarding the quality or strength of the radio frequency (RF) signals from the consumer's mobile device 102 being tested that then can be transmitted to the central server computer 506 for analysis. A second NFC-enabled mobile device 502 may not be capable of providing data indicating whether or not a metallic case or an RFID sticker was added to the consumer's mobile device 102, and generally will not be able to obtain RF signal strength data from the consumer's mobile device. Thus, the NFC test device 504 may include circuitry configured to provide additional testing functionality that is not available when a second NFC-enabled device 502 (such as another consumer's Smartphone) is utilized to test the consumer's mobile device 102.

As mentioned above, the test area 516 of the NFC test device 504 may include one or more indicators 518 and 520 that are visible to the consumer. Such indicators (and any additional indicators) may be one, two, or three-dimensional (1D, 2D or 3D) barcodes, and may be provided on another portion or portions of the test area 516. One dimensional barcodes, or 1D barcodes, are the well-known, zebra-striped barcodes commonly utilized by the retail industry on item packaging in retail stores. The 1D barcodes represent data horizontally, under the form of black bars and white spaces, may include letters or numbers, and can be read by a point-of-sale (POS) reader and/or by a mobile device using an integrated mobile device camera and a simple reader software application. The barcodes 518 and 520 shown on the test area 516 are 2D barcodes, which encode information both horizontally and vertically, in the form of rectangles forming various patterns, and thus are capable of storing thousands of characters. For example, the recently popular "Quick Response" 2D topology, known as "QR codes," consist of an array of black and white squares that are machine-readable. The QR codes can be used to store universal resource locators (URLs) and/or other information, and can easily be read by a smartphone by using a smartphone camera and a simple QR reader application. In addition, 2D barcodes offer error-correction, and thus a damaged 2D barcode can still provide information. For example, a smartphone can read a QR code, be automatically directed to particular website, and display instructions and/or a marketing message and/or other information to the user on the mobile device's display screen. 3D barcodes can resemble 2D barcodes, but in some implementations the bars and/or squares of 3D barcodes protrude from or extend from the surface at different heights. Thus, when a 3D barcode is touched by a person, a texture can be felt. The 3D barcodes are also machine readable with the height of the different features being calculated, for example, by a laser scanner as a function of the time it takes the laser light to travel to a code feature and back to a reader. Thus, for some types of 3D barcodes, a special reader device is required.

Accordingly, the 2D barcodes or indicators 518 and/or 520 shown in FIG. 5 could be read by the consumer's mobile device and used to initialize the NFC test application, to confirm correct re-positioning of the consumer's mobile device during testing, and could also be used to confirm alignment of the consumer's mobile device initially and/or during testing (to check that the consumer has placed the consumer mobile device in the correct area and/or orientation at various stages of NFC circuitry testing). For example, a camera of a Smartphone may be operated on command by the central server 506 to focus on one of the indicators 518 or 520 as it is being placed onto the test area 516. If the picture being transmitted to the central server 506 from the consumer's mobile device indicates misalignment, then the central server computer can transmit a message for display on the display screen 524 (or on the consumer device display screen 105) notifying the consumer to move the consumer mobile device to the correct position. The central server computer 506 may also transmit a command to the consumer's mobile device 102 to display a QR code on the display screen 105 for reading by the camera 505 of the NFC test device 504 during NFC circuitry testing. In an implementation, the NFC test device 504 may read the QR code on the display screen 105 and then transmit data to the central server computer 506 to confirm positioning of the consumer's mobile device 102. In another implementation, the NFC test device 504 may read the QR code on the display screen 105 and then run a particular diagnostic test, obtain diagnostic data, and then transmit the diagnostic data to the central server computer 506.

Thus, once the consumer has downloaded the NFC test application onto his or her mobile device, or locates it on the device by using, for example, a graphical user interface, the consumer may then initialize or run the NFC test application. As explained above, the NFC test application requires another device, which may be a second NFC-enabled device 502 running the same NFC test application to execute one or more NFC circuitry diagnostic tests.

Referring again to FIG. 5, in some embodiments once the NFC test application is initiated, the consumer is presented with a prompt on a display screen 105 of the consumer's NFC-enabled mobile device 102 to position the mobile device 102 in a particular manner for communication with the second NFC-enabled device 502. Once positioned, the consumer's mobile device 102 operates to exchange a shared identity with the second NFC-enabled device 502. Exchanging a shared identity may be accomplished in a number of ways. For example, the consumer's mobile device 102 or the NFC-enabled device 502 may generate a random unique reference which is then passed to the other device such that when the devices communicate with the central server computer 506 the central server computer knows that both devices are part of the same NFC test. In another example, both the consumer's mobile device 102 and the NFC-enabled device 502 obtains a unique reference number, such as a serial number or phone number, from the other device. Subsequently, when the consumer's mobile device 102 communicates with the central server computer 506, it tells the central server computer its identity and the unique reference number of the NFC-enabled device, and when the NFC-enabled device communicates with the central server computer 506 it tells the central server computer its identity and the unique reference number of the consumer's mobile device 102. In this manner, the central server computer 506 knows that the consumer's mobile device 102 and the NFC-enabled device 502 are engaged in the same NFC test. The shared identity data may be communicated across the NFC test interface during the initial setup of the NFC testing, but if the interface is so faulty that this is not possible, then the user may alternatively capture a QR code displayed on a display component of the NFC-enabled device 502, or the user may manually enter the shared identity data by using a keyboard or touchscreen into each device. It should be understood that other methods may also be possible for generating a shared identity and communicating it to the central server computer 506.

As explained above, in an implementation the shared identity is transmitted by the consumer's mobile device 102 via the MNO 510 and the Internet 512 to the central server computer 506. As part of the testing process, the NFC test application may also transmit mobile device information such as a serial number of the consumer's mobile device, or the International Mobile Equipment Identifier (IMEID) of the consumer's mobile device. The identification data may be stored by the central server computer 506 to tie the consumer to that particular mobile device, for example, for customer service purposes in the future. The central server computer 506 then interfaces with and/or operates to control the NFC test applications that are running on both the consumer's mobile device 102 and the second NFC-enabled device 502 to perform a plurality of NFC circuitry diagnostic tests. During this time a message such as "Test App Running" (as shown in FIG. 5) may be caused to appear on the consumer's mobile device display screen 105 and on a display screen 503 of the second NFC-enabled mobile device 502. While the NFC test application is running, data and/or instructions are communicated between the consumer's mobile device 102, the second NFC-enabled device 502 and the central server computer 506, which tests the operation of the NFC circuitry of the consumer's mobile device 102. As also mentioned above, the NFC test application could also be initialized and run between the consumer's mobile device 102 and the NFC test device 504 in a similar manner.

In some implementations, the central server computer 506 instructs the consumer's mobile device 102 to operate in a payment-enabled mode of operation and instructs the second NFC-enabled device 502 to operate as a proximity reader device (in a terminal mode of operation). A series of NFC diagnostic tests may then be run, and results data then recorded or saved by the central server computer in the NFC test database 526. Next, the central server computer 506 instructs the second NFC-enabled device 502 to enter a payment transaction mode of operation and the consumer's mobile device 102 to enter a proximity reader mode of operation, and repeats the NFC diagnostic tests. The consumer's mobile device 102 may then again transmit the NFC circuitry diagnostic test results to the central server computer 506 for analysis (and/or the second NFC-enabled mobile device 502 may transmit NFC test data to the central server 506 for analysis), and the test results data again saved by the central server computer 506 in the NFC test database 526.

In some embodiments, the central server computer 506 utilizes the test results data to build a list of faults and symptoms, and such data can then be used to improve the overall NFC testing system over time. For example, the test results data stored in the NFC test database 526 may allow the NFC test system to learn (or determine) that mobile devices manufactured by a particular company typically include payment application software that performs erratically under certain types of conditions, and to determine that in most cases the problem can be solved by resetting the payment application by powering the consumer's mobile device OFF and then ON again. Therefore, when NFC test results data from that particular type of consumer mobile device indicates such a problem, a message may be selected by the central server computer 506 and transmitted to the consumer's mobile device 102 instructing the user to power the consumer mobile device 102 OFF and then ON again before submitting to further NFC testing and/or using the mobile device to conduct a NFC communication or transaction. In another example, when an NFC circuit fault is flagged, in some implementations the central server computer 506 may access the NFC test database 526 to see if such an NFC circuit fault has been found in similar or the same type of mobile devices to the consumer's mobile device 102. Such operation may be useful to help the central server computer debug or troubleshoot many different types of NFC circuitry faults or problems.

The NFC diagnostic test results data stored in the NFC test database 526 may be accessed for a particular consumer's mobile device 102 whenever NFC testing is initialized in the future and may be compared to previous NFC diagnostic test results. Such old sets of test data for a particular mobile device of a user can be compared to new NFC diagnostic test results to determine if the mobile device quality is degrading over time. For example, NFC signal strength data from a prior test (or many prior tests) may be compared to new NFC test diagnostic data and may indicate that the NFC circuitry is degrading. In such a case, the central server computer 506 may transmit a message to the user informing him or her of such a finding, and possibly suggesting an upgrade to a new mobile device.

In some implementations, the process may also include the consumer's mobile device 102 receiving NFC test results and/or an NFC diagnostic analysis report for display on the display screen 105 for review by the consumer. In some cases, depending on the NFC test results and/or NFC diagnostic test analysis (which may include an analysis of NFC fault data stored in the NFC test database 526), the central server computer 506 may download one or more application program interface (API) processes to run on the consumer's mobile device 102 to correct the NFC circuitry problems. However, in some other cases wherein such a fix is not available at the time of testing, a different message may be transmitted for display on the consumer's mobile device informing the consumer that he or she will be notified when a fix is available. Thus, the user's identification data can be stored and then later used to notify the consumer when, for example, software is available for download to cure the problem. In some other types of cases, a software fix may not be possible for a particular NFC circuitry fault of payment application software fault, and thus the central server computer 506 may download a message for display on the display screen 105 that instructs the consumer to return the consumer's mobile device to a mobile device supplier or manufacturer for repair.

In some implementations, the consumer may elect to perform NFC circuit testing of his or her consumer mobile device 102 with an NFC test device 504 which may be located, for example, at a merchant location. As mentioned above, the NFC test device 504 may include the capability of performing NFC diagnostic tests that cannot be carried out by the NFC-enabled mobile device 502 (or other consumer mobile devices), such as testing the field strength and/or the relative electronic noise of the NFC circuitry of the consumer's mobile device. Such tests may entail the consumer being instructed to move the consumer mobile device 102 onto the test area 516 in particular orientations, or to tap the consumer mobile device on a particular place of the test area 516. It should be understood that the NFC circuit diagnostic testing may also entail having the central server computer 506 analyze cryptograms generated by the NFC test application during a zero-sum payment transaction test, and analyzing the authorization response from such test payment transactions. As also mentioned above, the NFC test device 504 may be connected to or include an integrated printer (not shown) for use to output a copy of the NFC test results to the consumer. The consumer may be required to send the printed output showing NFC circuit failure results along with the consumer mobile device when shipping that mobile device to a device manufacturer or supplier for repair or replacement.

In some implementations, the NFC test device 504 may be operable to prompt the consumer to provide an e-mail address or other contact information for receiving one or more different types of messages. For example, the NFC test device 504 may be configured for transmitting an e-mail version of the NFC test results to an e-mail address of the consumer, which may include a message indicating that the NFC circuitry is functioning correctly. In some other cases, the e-mail message may indicate that the NFC circuitry is currently functional, but that the test results indicate that it is starting to fail or that it has failed and needs to be repaired or replaced. In other instances, an e-mail message may indicate that a particular NFC circuitry or payment software problem has been discovered, but cannot be resolved or fixed at that time, but when a fix is subsequently identified another e-mail message will be transmitted to the consumer.

In some embodiments, the NFC test application on the consumer's mobile device 102 is operable to capture information to confirm, for example, that the NFC circuitry is enabled, whether or not that NFC circuitry has been used to perform any NFC transactions in the past, and/or whether the NFC circuitry has detected an NFC field previously. With regard to NFC circuitry functionality, the consumer's mobile device processor may be operable to retrieve NFC operation data associated with prior operation of the NFC circuitry from a memory or storage device, or the processor may function to obtain such prior NFC circuitry operation data from one or more usage logs. In some implementations, such information may be communicated to the consumer, for example, via the display screen 105 and/or may be transmitted to the central server computer 506 for NFC circuitry testing purposes and/ or for storing in the NFC test database 526. The NFC test application may also operate to turn ON a consumer's mobile device camera (not shown) and to prompt or direct the consumer to place his or her mobile device (such as the Smartphone 102) into close proximity with the second NFC-enabled mobile device 502. During this testing procedure, the central server computer 506 may instruct the second NFC-enabled device 502 to display a test pattern (such as a "bulls eye" pattern or 2D barcode) on the display screen 503 that the camera of the consumer's mobile device will pick up if the consumer has placed his or her mobile device in the correct position.

In some embodiments, after the central server computer 506 confirms that the consumer's mobile device 102 is in the correct position (by checking the picture transmitted from the camera of the consumer's mobile device), then NFC diagnostic testing occurs. Similarly, if the NFC test device 504 is being utilized, the central server computer 506 may instruct the consumer to place the consumer mobile device 102 face-up onto the test area 516, and when so placed, to tap the touch screen 105 so that NFC testing may commence. Once the Smartphone 102 is positioned correctly, in some embodiments, the NFC test application causes the Smartphone 102 to enter into a reader mode of operation that powers one or more NFC tags of the NFC test device and the NFC circuitry of the Smartphone, under control of the NFC test application, attempts to communicate with one or more of the NFC tags to perform self-testing. In some embodiments, an NFC test application process may require placing the Smartphone 102 in more than one position or orientation on the test area 516 as the testing process progresses. A multiple step NFC test process may therefore involve placing the consumer's mobile device 102 in a first position, moving it to a second alternate position, and possibly repositioning the mobile device a third time (such as screen-side up, screen-side down, and/or in offset positions). Such multi-step NFC test procedures may be followed during the normal course of testing, and/or when more extensive testing may be required, for example, to troubleshoot an NFC circuitry communications problem. In such cases, the central server computer 506 may transmit messages or instructions for display on the display screen 105 of the Smartphone 102 to prompt the consumer to pick up and move the Smartphone one or more times during testing, which may include placing the mobile device on edge, or otherwise askew with regard to the test area 516. Thus, one or more test area support features such as shelves or inserts (not shown) may be provided for placement onto the test area 516 before placement of the consumer's mobile device 102 thereon, to create additional offset positions to increase the available number of NFC circuit testing positions.

In some embodiments, the NFC test application is operable to display the NFC self-test results on the touch screen 105 for the consumer to verify, for example, that the NFC circuitry is functioning correctly, or that a possible problem with the hardware has been identified. If a possible problem has been detected, the consumer may be provided with instructions that may possibly solve the problem (for example, a reset procedure may be suggested), and/or the consumer may be instructed to call (or otherwise contact) a customer service representative. Depending on the severity of the problem, the customer service representative may verbally ask the consumer to retry running the NFC test application, or may direct the consumer to try several different processes that may correct the issue. For example, the consumer may be directed to power the consumer mobile device OFF, remove the battery, re-install the battery, power the mobile device ON, and then run the NFC test application again. In some embodiments, the customer service representative can take control of the Smartphone 102 via the central server computer 506 and NFC test application to conduct further testing remotely in order to diagnose the problem, and/or to recover more details from the consumer's mobile device, such as additional test information, data from mobile device usage logs, and the like. In some cases, the customer service representative may direct the consumer to return the mobile device to the manufacturer or to a repair facility for further investigation and/or repair. In cases where the consumer is directed to ship the mobile device to the manufacturer or repair facility, a shipping label may be provided via a website and/or a replacement mobile device may be provided.

In some embodiments, the central server computer 506 may populate the NFC test database 526 with anonymous NFC test results data. The anonymous NFC test results data thus does not contain any consumer identification information, but does include NFC circuit test results data that are associated with a plurality of mobile devices. The NFC test results data in the NFC test database 526 may be used to identify typical fault profiles that may be attributed to particular types and/or models and/or brands of mobile devices. For example, mobile telephones manufactured by Samsung® may be prone to a particular type or types of NFC circuitry faults, while mobile telephones manufactured by Nokia® may be prone to a different type(s) of NFC circuitry fault, and such tendencies or fault data may be stored in the NFC test database for use in debugging those types of mobile telephones. In particular, when the consumer mobile device being tested is manufactured by manufacturer "A," then a particular series of diagnostic tests may be run in a particular order, whereas when the consumer mobile device being tested is manufactured by manufacturer "B," a different set of diagnostic tests and/or a different order of diagnostic tests will be utilized. Furthermore, additional and/or different types of fault data concerning NFC transaction problems may be stored in the NFC test database 526 for use by the central server computer 506 to debug NFC communications problems. For example, a consumer may be asked to provide information concerning the merchant and/or the merchant location at which the consumer's mobile device encountered an NFC communication problem. Such information may indicate that the problem lies with the merchant's proximity reader device and not the consumer's NFC enabled mobile device. For example, if numerous consumers report NFC transaction communications problems occurring at the Merchant "C" retail store, then the central server computer may transmit a message informing the consumer of the likely problem. Thus, the fault data in the NFC test database 526 can be used to identify common mobile device faults associated with particular mobile devices to help efficiently debug those devices, and/or may identify other sources that may be contributing to or causing an NFC communications problem.

Figure 6:
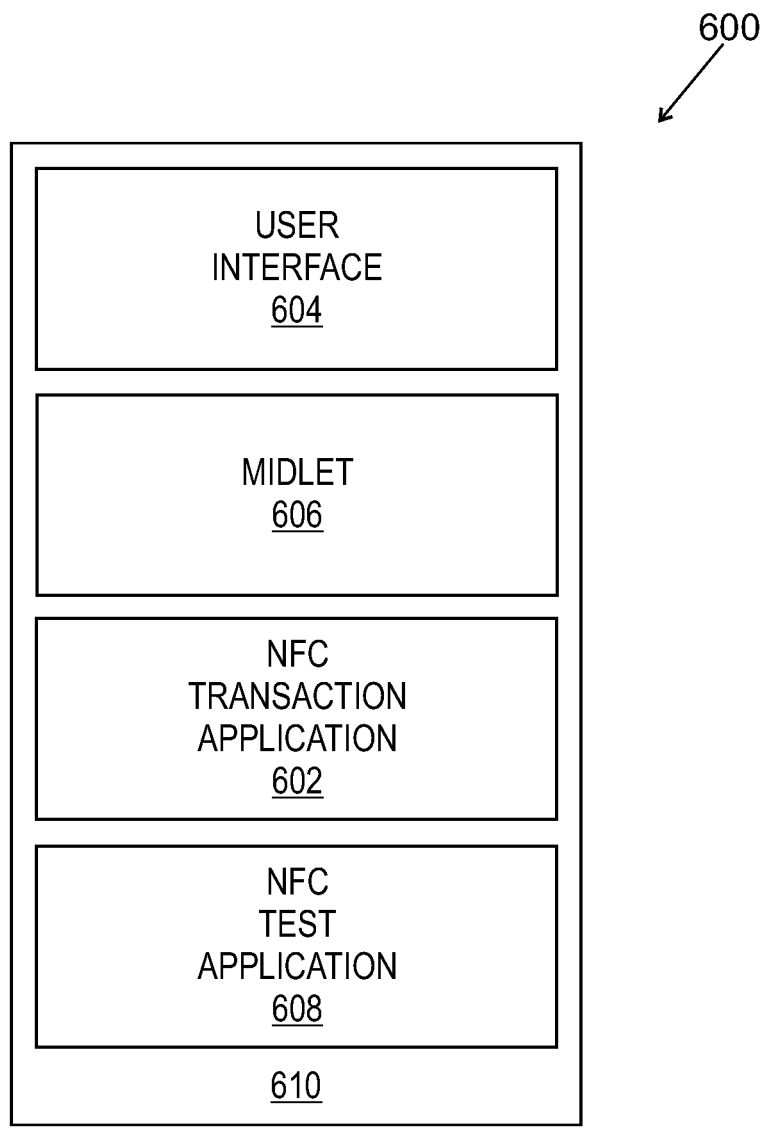
FIG. 6 is a block diagram schematically illustrating some software aspects of an NFC-enabled consumer mobile device according to an embodiment of the disclosure.

FIG. 6 is a block diagram 600 that schematically illustrates some software aspects of the consumer's mobile device 102. In some embodiments, an NFC transaction application 602 may be operable in a transaction mode and in a terminal mode. The NFC transaction application 602 may operate in the transaction mode, for example, when the NFC circuitry of the consumer's mobile device 102 is engaged in an exchange of communications with a proximity reader component 204 (see FIGS. 2 and 3) during a purchase transaction. The NFC transaction application 602 may switch to a terminal mode of operation to receive data from another NFC-enabled mobile device when the NFC circuitry of the consumer's mobile device is being tested.

Referring again to FIG. 6, user interface software 604 may control a portion of the operations of the main processor 404 (shown in FIG. 4) of the consumer's mobile device. For example, the user interface software 604 may receive input from, and control displaying of information on, the mobile device touch screen 105 (shown in FIG. 5). Thus, the NFC transaction application program 602 and the user interface software 604 may interact with each other to allow the consumer to control and/or respond to NFC transaction functionality of the Smartphone 102. The interaction between the NFC transaction application program 602 and the user interface software 604 may be mediated by a software program 606 that may be referred to as a "midlet." The midlet 606 may interact with the user through the user interface (for example, a touch screen display) via the user interface software 604 to receive input from the consumer, for example, during the NFC testing process. The midlet 606 may instruct the NFC transaction application program 602 as to how the NFC transaction application program 602 is to be configured in a transaction mode and/or in a terminal mode of operation. Similarly, the NFC test application 608 and the user interface software 604 may interact with each other to provide the consumer with one or more prompts, for example, to place the Smartphone 102 in close proximity to a second NFC-enabled mobile device to exchange a temporary identity, and then to initiate NFC circuitry testing as disclosed herein. The interaction between the NFC test application 608 and the user interface software 604 may be mediated by the midlet 606, which may interact with the consumer through the user interface (the touch screen display) via the user interface software 604 to receive input, such as a tap to indicate placement of the mobile device onto a test area 516 of the NFC test device 504 (see FIG. 5). The midlet 606 may also receive program instructions and the like from the central server computer 506 during NFC testing, and when required, interact with the consumer through the user interface 604 to provide output, for example, a message on the display screen for the consumer to reposition the consumer's mobile device during NFC testing. The midlet 606 may also instruct the consumer's mobile device processor to enter the transaction mode of operation to power up the NFC circuitry while the NFC test application program 608 attempts to communicate with the NFC test device 504 to test the NFC circuitry of the consumer's mobile telephone.

The NFC transaction application program 602, the user interface software 604, the midlet 606 and the NFC test application 608 may each be stored in one or more of the memory devices referred to above in conjunction with FIG. 4, and such memory devices are collectively represented by block 610 in FIG. 6. The storage device 610 is a non-transitory computer readable medium and/or any form of computer readable media capable of storing computer instructions and/or application programs and/or data. It should be understood that non-transitory computer-readable media comprise all computer-readable media, with the sole exception being a transitory, propagating signal.

In some embodiments, the NFC test application 608 may also function to store or record data concerning operation of the NFC circuitry over time in order to accumulate and/or provide data concerning NFC circuitry performance. Thus, in some implementations the consumer's mobile device records or stores NFC usage data which includes use of the NFC circuitry by all mobile device applications, and stores background data, such as field strength data and electronic noise level data. Such NFC usage data and background data may be automatically transmitted to the central server computer 506, for example, at periodic intervals such as daily, weekly, monthly, quarterly and the like. The central server computer may then compare the NFC usage data and background data to predetermined and/or expected NFC usage data and background data (including field strength data and electronic noise level data). In this manner, the central server computer may be able to determine when degraded NFC circuitry operation is occurring (wherein the consumer's mobile device NFC circuitry is functioning, but not working very well or as expected). When the results of such comparisons indicate a reduction in NFC circuitry performance over time (as the consumer is using his or her mobile device), the central server computer may transmit a message or prompt to the consumer to perform NFC circuitry testing to pinpoint any problems, and/or prompt the consumer to contact the device manufacturer or device supplier for further information and/or instructions.

In some embodiments, the consumer's mobile device 102 may operate to automatically transmit performance data to the central server computer 506 when the NFC test application 608 determines that the NFC circuitry is operating with reduced NFC circuit performance. When the central server computer 506 receives such performance data indicating reduced NFC circuit performance, it may contact the user before the NFC circuitry performance deteriorates to the point where the consumer's mobile device can no longer be used for NFC transactions such as payment transactions. In such cases, a text message, voice message, and/or instructions may be transmitted to the mobile device informing the user to take action such as performing NFC testing, visiting a website that provides information, and/or contacting a customer service representative of the device manufacturer or supplier.

Figure 7:
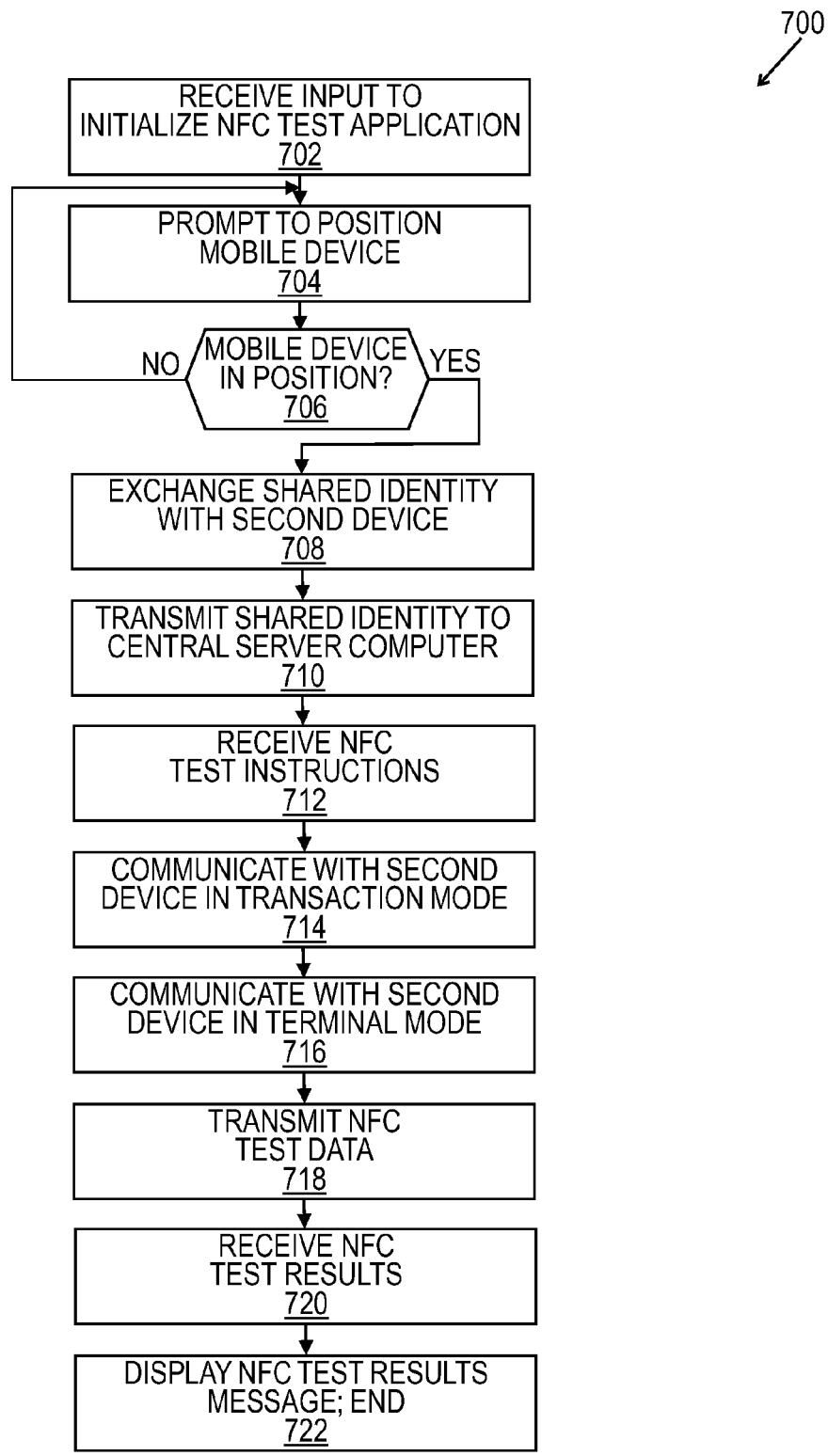
FIG. 7 is a flowchart illustrating an embodiment of an NFC testing process in accordance with an embodiment of the disclosure.

FIG. 7 is a flowchart 700 illustrating an embodiment of an NFC application testing process. In step 702, a processor or control circuitry of the consumer's mobile device receives consumer input to initialize an NFC test application stored on the consumer's mobile device. The processor then displays 704 on the consumer's mobile device display screen a prompt for the consumer to position his or her mobile device for communications with a second NFC enabled device. Next, if the processor receives 706 an input from the consumer indicating that the consumer mobile device is in the correct communications position, then the consumer mobile device 102 and the second NFC-enabled mobile device exchange 708 a shared identity. For example, the consumer may tap the touch screen 105 of his or her mobile device 102 when the mobile device is near the second NFC-enabled mobile device. However, if in step 706 there is no consumer input, the process may idle and then branch back to step 704 to again prompt the consumer to position his or her mobile device for NFC circuitry testing. In some embodiments, if a predetermined delay time expires, then the process ends.

Referring again to FIG. 7, after the shared identity has been exchanged, the processor then transmits 710 the shared identity to a central server computer. Next, the processor of the consumer's mobile device receives 712 a plurality of NFC test instructions from the central server computer, communicates 714 with the second NFC-enabled device in a transaction mode of operation under control of the central server computer in accordance with the NFC test instructions, and then switches to communicate 716 in a terminal mode of operation according to the NFC test instructions with the second NFC-enabled device to test the NFC circuitry of the consumer's mobile device. The processor then transmits 718 NFC circuitry test data to the central server computer. In some embodiments, the processor receives 720 NFC circuitry test results from the central server computer, and then displays 722 an indication of the NFC circuitry test results to the consumer. In some implementations, the test results indication that is displayed includes a message indicating a successful completion of the NFC circuitry tests, and/or a message that the NFC circuitry functioned correctly, and/or that the NFC circuitry failed to function correctly, and/or instructions to contact customer support of a device manufacturer and/or a device supplier. After displaying the NFC test results message(s), the process then ends.

Figure 8:
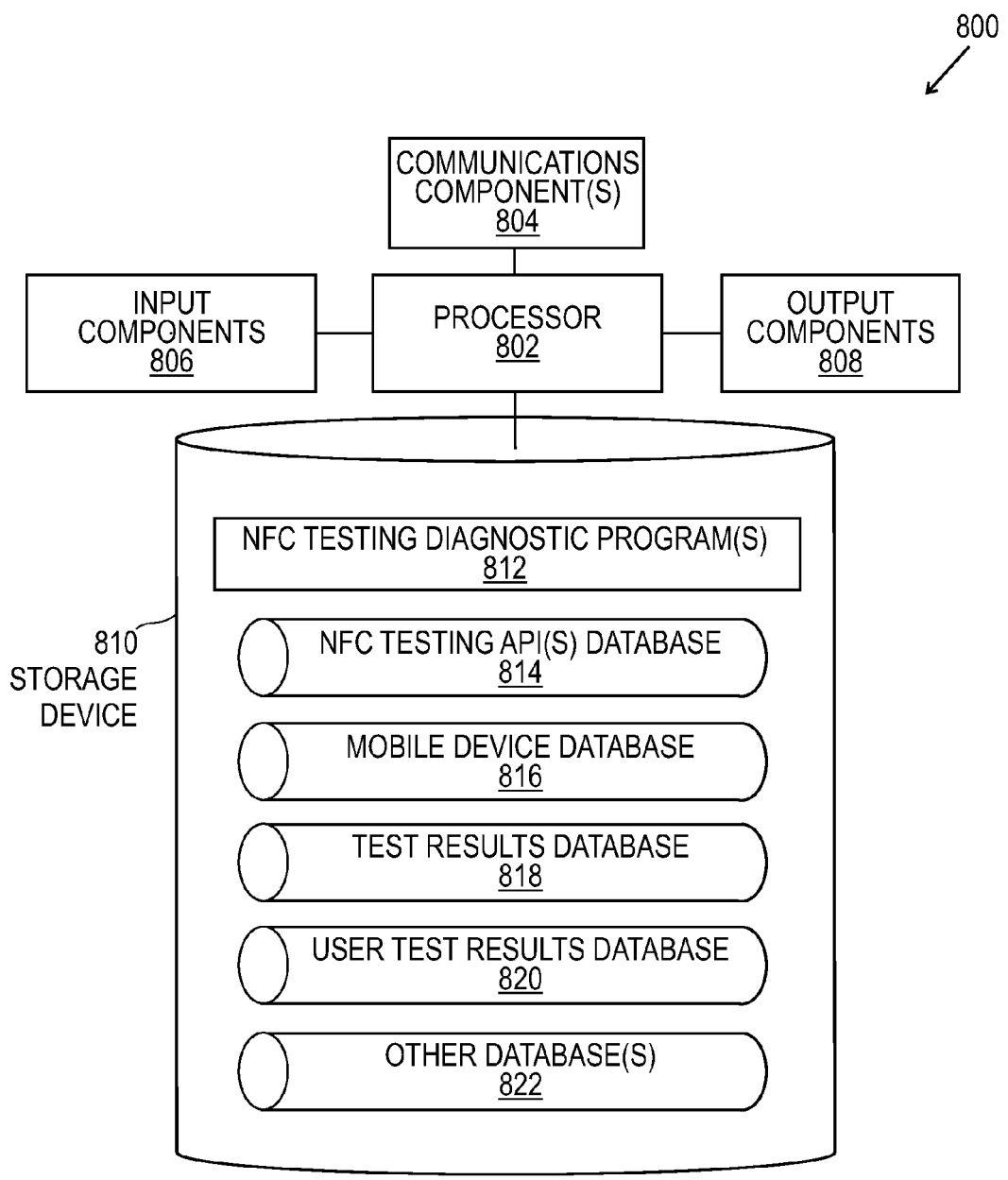
FIG. 8 is a block diagram of an NFC test server computer for providing NFC diagnostic testing functionality according to an embodiment of the disclosure.

FIG. 8 is a block diagram of an NFC test server computer 800 configured to provide NFC diagnostic testing functionality according to an embodiment of the disclosure. Such an NRC test server computer may be owned and/or operated by a payment card system operator such as MasterCard International Incorporated, the assignee hereof. As shown in FIG. 8, a computer processor 802 is operatively coupled to communication component(s) 804, input component(s) 806, output component(s) 808, and a storage device 810.

The computer processor 802 may be constituted by one or more conventional processors. Processor 802 operates to execute processor-executable steps, contained in program instructions described herein, so as to control the NFC test server computer 800 to provide desired NFC testing functionality.

Communication component(s) 804 may be used to facilitate communication with, for example, other devices (such as consumer mobile devices and/or NFC test devices (not shown)). Communication component(s) 804 may, for example, have capabilities for sending and receiving messages over WiFi networks, via the Internet, and/or engaging in data communication over conventional computer-to-computer data networks.

Input component(s) 806 may comprise one or more of any type of peripheral device typically used to input data into a computer. For example, the input device 806 may include a keyboard and/or a mouse or may be a touchscreen. Output component(s) 808 may comprise, for example, a touchscreen display and/or an audio speaker or some other device.

Storage device 810 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory. Thus, the storage device 810 is a non-transitory computer readable medium and/or any form of computer readable media capable of storing computer instructions and/or application programs and/or data. It should be understood that non-transitory computer-readable media comprise all computer-readable media, with the sole exception being a transitory, propagating signal.

Storage device 810 stores one or more programs or applications for controlling the processor 802. The programs comprise program instructions that contain processor-executable process steps of the NFC test server computer 800, including, in some cases, process steps that constitute processes provided in accordance with principles of the present invention, as described herein.

The programs stored by the storage device 810 may include NFC testing diagnostic programs 812 that manage a process by which consumers or users contact the NFC test server computer 800 to initiate NFC testing of their mobile devices. In some embodiments, the NFC testing diagnostic programs 812 obtain consumer information and consumer mobile device information and/or data during the initiation process as described herein.

The storage device 810 may also store one or more databases, such as an NFC testing API(s) database 814, a Mobile Device database 816, a Test Results database 818, a Consumer's or User's Test Results database 820, and other database(s) 822). The NFC testing API(s) database 814 may include a plurality of API(s) of different types, which the NFC test server computer 800 can use to select a particular type of NFC testing API to download to a consumer's mobile device (which may depend on the type of mobile device). The Mobile Device database 816 may include data associated with a plurality of consumer mobile devices, which data may be obtained from various sources, and which may include test data that can be utilized by the NFC test server computer 800 to make NFC testing decisions. The NFC test server computer 800 may be operable to obtain and store test results data to populate the Test Results database 818 with, for example, anonymous NFC test results that are associated with particular mobile devices, but that are not associated with particular users or consumers. In addition, the NFC test server computer 800 may be operable to obtain and store NFC test results data to populate the User Test Results database 820 with historical NFC test results associated with NFC test results of each consumer's mobile device. Other database(s) 822 may also be included, for storing and/or obtaining various types of information and/or data.

The application programs of the NFC test server computer 800 may be combined in some embodiments, as convenient, into one, two or more application programs. Moreover, the storage device 810 may store other programs, such as one or more operating systems, device drivers, database management software, web hosting software, and the like.

Figure 9:
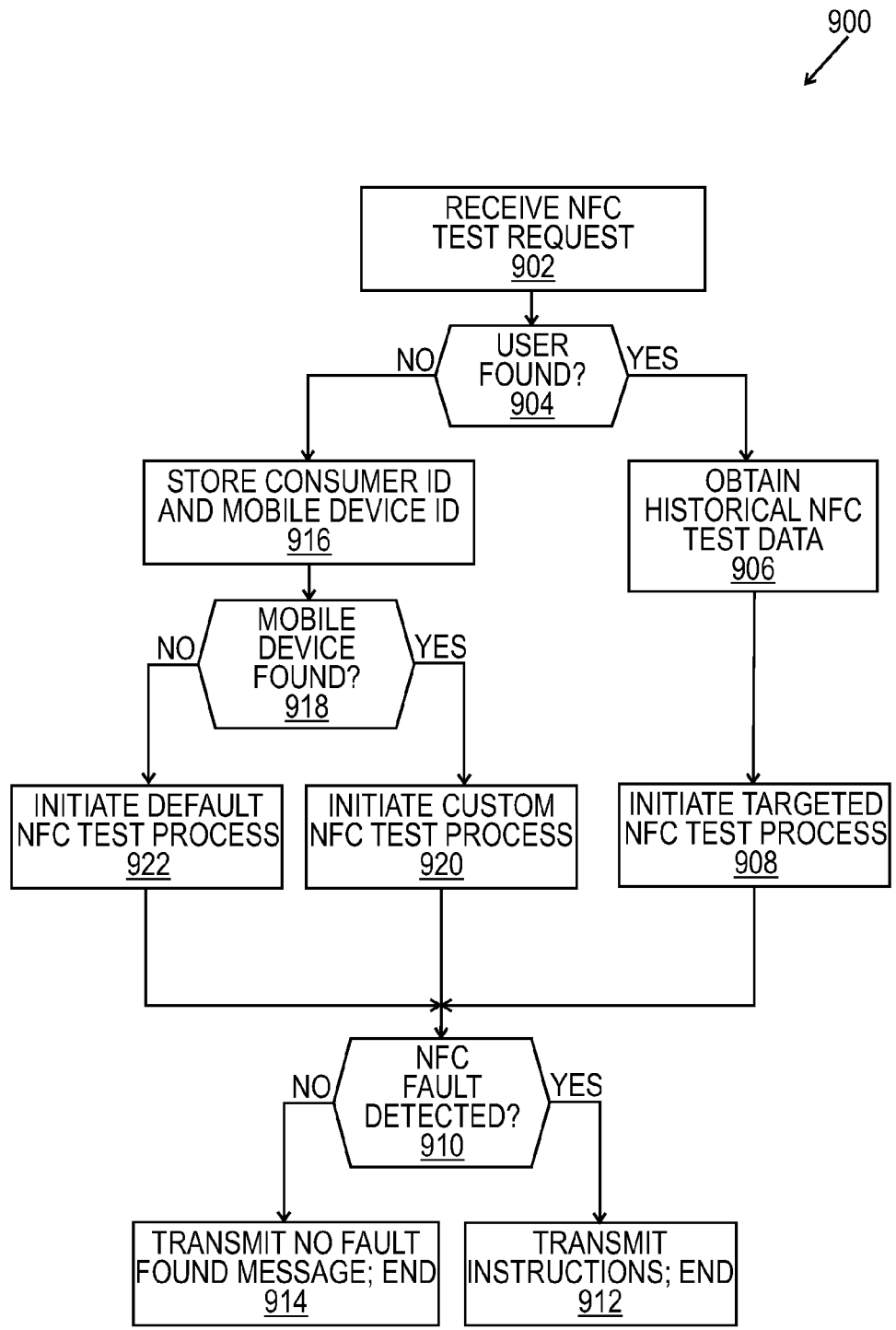
FIG. 9 is a flowchart illustrating an NFC test server computer process according to an embodiment of the disclosure.

FIG. 9 is a flowchart illustrating an NFC test server computer process 900 according to an embodiment. The NFC test server computer receives 902 a request for NFC testing from a consumer's mobile device, and the request may include a shared identity, a serial number of the consumer's mobile device (or the International Mobile Equipment Identifier (IMEID) of the consumer's mobile device), and other data or information. The NFC test server computer then determines 904 if that consumer's mobile device was previously tested, and if so obtains 906 historical NFC test data from a database. The NFC test server computer then initiates 908 a targeted NFC test process that is tailored to that consumer's mobile device, which may be based on past NFC test results and/or known NFC circuitry faults and/or payment software faults associated with that type of consumer mobile device. The NFC test server computer may then, for example, interface with and/or control the NFC test applications that are running on both the consumer's mobile device and a second NFC-enabled device to perform a plurality of NFC circuitry diagnostic tests as explained herein. If the NFC test server computer detects 910 an NFC circuitry or payment software fault, then the NFC test server computer transmits 912 instructions to the consumer's mobile device, and the process ends. But if no NFC circuitry or payment software faults are detected in step 910, then the NFC test server computer transmits 914 a "No Fault Found" message to the consumer's mobile device, and the process ends.

Referring again to step 904, if the NFC test server computer cannot identify the consumer's mobile device, then the NFC test server computer stores 916 consumer mobile device identification data (such as the IMEID). The NFC test server computer then determines 918 if the consumer's mobile device is of a type found in a mobile device database, and if so initiates 920 a custom NFC test process. The custom NFC test process may include a specific order of NFC diagnostic tests to run on the consumer's mobile device based on experiences with the same or similar mobile device testing. Next, if the NFC test server computer detects 910 an NFC circuitry or payment software fault, then the NFC test server computer transmits 912 instructions to the consumer's mobile device, and the process ends. But if no NFC circuitry or payment software faults are detected in step 910, then the NFC test server computer transmits 914 a "No Fault Found" message to the consumer's mobile device, and the process ends.

Referring again to FIG. 9, in step 918 the NFC test server computer does not find the consumer's mobile device type in a mobile device database, then the NFC test server computer initiates 922 a default NFC test process. Next, if the NFC test server computer detects 910 an NFC circuitry or payment software fault, then the NFC test server computer transmits 912 instructions to the consumer's mobile device, and the process ends. But if no NFC circuitry or payment software faults are detected in step 910, then the NFC test server computer transmits 914 a "No Fault Found" message to the consumer's mobile device, and the process ends.

Consumers may consider using the NFC testing methods described herein to test their mobile devices as more desirable than or preferable to sending their NFC-enabled mobile device back to the phone manufacturer or supplier for testing and/or repair. This is so because many consumer mobile devices can be used for other functions (such as making wireless telephone calls, texting, browsing the internet, and/or listening to digital music) that do not require operational NFC circuitry, and some consumers would rather keep and use their mobile devices for these other activities until an actual NFC circuit hardware problem and/or software problem is confirmed. Thus, the NFC test systems, apparatus and methods disclosed herein may be utilized to confirm the functionality of, or problems attributable to, the NFC circuitry of consumer mobile devices. Such systems, apparatus and methods may also be utilized to troubleshoot and resolve any NFC communications problems of the consumer's NFC-enabled mobile device. Resolving consumer mobile device NFC functionality problems by using the disclosed NFC test systems and/or testing processes described herein is beneficial to mobile device manufacturers and/or suppliers (such as mobile device retailers) because these entities save significant costs. For example, when an NFC circuitry problem is successfully diagnosed and fixed (i.e., resolved remotely), then the manufacturer or supplier need not pay shipping costs to ship the consumer's mobile device to a repair facility for testing, and need not pay costs associated with providing the consumer with a replacement NFC-enabled mobile device. Remotely solving NFC circuitry issues also saves time involved with responding to consumer complaints concerning NFC mobile device communication issues. Moreover, providing a solution while the mobile device is still in the consumer's possession may increase customer satisfaction.

Aspects of the methods described above have been disclosed with reference to an NFC-enabled mobile device such as a payment-enable mobile telephone. However, it should be understood that the systems, principles and/or processes described in this disclosure are also applicable to other types of RFID communications technologies, and to other types of mobile devices configured to store instructions and/or data and that are operable to run a wireless communications self-test application. Any and all such electronic mobile devices, including payment-enabled mobile telephones, should be understood as included in the terms "NFC-enabled mobile device" and/or "consumer's mobile device."

Relative to an NFC-enabled mobile device and a contactless reader, the term "tap" refers either to brief physical contact, or to relative positioning between the devices such that wireless communication occurs.

As used herein and in the appended claims, the term "computer" should be understood to encompass a single computer or two or more computers in communication with each other or a computer network or computer system.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices. Such a memory and/or storage device may include any and all types of non-transitory computer-readable media, with the sole exception being a transitory, propagating signal.

The flow charts and descriptions thereof herein should not be understood to prescribe a fixed order of performing the method steps described therein. Rather, the method steps may be performed in any order that is practicable. In addition, the flow charts described herein should not be understood to require that all steps or elements be practiced in every embodiment. For example, one or more elements or steps may be omitted in some embodiments.

As used herein and in the appended claims, the term "payment card account" includes a credit card account or a deposit account or other type of financial account that an account holder may access with or without a physical payment card. The term "payment card account number" includes a number that identifies a payment card system account or a number carried by a payment card, or a number that is used to route a transaction in a payment system that handles debit card and/or credit card transactions. The term "payment card" may include, but is not limited to a credit card, a debit card, a transit card, an identification card, a loyalty card, and/or a gift card.

As used herein and in the appended claims, the terms "payment card system" and/or "payment network" refer to a system and/or network for handling purchase transactions and related transactions, which may be operated by a payment card system operator such as MasterCard International Incorporated, or a similar system. In some embodiments, the term "payment card system" may be limited to systems in which member financial institutions (such as banks) issue payment card accounts to individuals, businesses and/or other organizations.

Although the present disclosure describes specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
 receiving, by a processor of a consumer's mobile device, input to initialize a near-field communication (NFC) test application;
 displaying, by the processor on a display screen, a prompt to position the consumer's mobile device to communicate with an NFC-enabled device;
 receiving, by the processor, input indicating that the consumer's mobile device is in a communication position;
 exchanging, by the processor and the NFC-enabled device, a shared identity;
 transmitting, by the processor, the shared identity to a central server computer;
 receiving, by the processor from the central server computer, a plurality of NFC test instructions;
 communicating, by the processor, in a transaction mode of operation with the NFC-enabled device according to the NFC test instructions;
 communicating, by the processor, in a terminal mode of operation with the NFC-enabled device according to the NFC test instructions; and
 transmitting, by the processor to the central server computer, NFC test data.

2. The method of claim 1, further comprising:
 receiving, by the processor from the central server computer, NFC test results; and
 displaying, by the processor on the display screen, an indication to the consumer regarding the NFC test results.

3. The method of claim 2, wherein the indication displayed to the consumer comprises a message indicating at least one of a successful completion of NFC testing, that the NFC circuitry and payment software functioned correctly, that the NFC circuitry failed to function correctly, that the payment software failed to function correctly, that a fix was downloaded to the customer's mobile device, and instructions to contact customer support of at least one of a mobile device manufacturer and a mobile device supplier.

4. The method of claim 1, further comprising:
 receiving, by the processor from the central server computer, a failure indication associated with failure of at least one of NFC circuitry and payment software of the consumer's mobile device; and
 displaying, by the processor on the display screen, a message instructing the consumer to return the consumer's mobile device to one of a mobile device manufacturer or a mobile device supplier for repair.

5. The method of claim 1, further comprising, prior to initializing the NFC test application, downloading, by the processor, an NFC test application from at least one of the central server computer and an Application Store.

6. The method of claim 1, wherein the NFC-enabled device comprises an NFC test device operable to at least one of analyze field strength, analyze relative electronic noise, and analyze cryptograms and authorization responses generated by NFC test transactions.

7. The method of claim 6, wherein the NFC test device further comprises a printer, and further comprising printing NFC test results when at least one of the NFC circuitry and payment software of the consumer's mobile device failed to function correctly.

8. The method of claim 1, further comprising, subsequent to receiving input to initialize the NFC test application:
 retrieving, by the processor from a memory of the consumer's mobile device, NFC usage data, background data, and data indicating functionality of the NFC circuitry; and
 transmitting, by the processor to the central server computer, the NFC usage data, the background data, and data indicating functionality of the NFC circuitry.

9. The method of claim 8, further comprising:
 receiving, by the processor from the central server computer, NFC test instructions for remote control of the consumer's mobile device, the NFC test instructions based on at least one of the NFC usage date, the background data, and the data indicating functionality of the NFC circuitry; and
 executing, by the processor, the NFC test instructions enabling remote control of NFC testing by the central server computer.

10. The method of claim 1, further comprising, prior to displaying the prompt to position the consumer's mobile device:

initializing, by the processor, an integrated camera of the consumer's mobile device;

receiving, by the processor, visual data from the integrated camera associated with positioning of the consumer's mobile device; and transmitting, by the processor, the visual data to the central server computer.

11. The method of claim 10, wherein the visual data comprises data associated with a barcode.

12. The method of claim 11, wherein the barcode comprises at least one of a two-dimensional barcode and a three dimensional barcode, and further comprising:

reading, by the mobile device camera, barcode data comprising a uniform resource locator (URL); and displaying, by the processor on the display screen, a website associated with the URL providing further instructions for the user.

13. The method of claim 10, further comprising:

receiving, by the processor, a message from the central server computer indicating that the consumer's mobile device has been incorrectly positioned; and displaying, by the processor, a prompt on the display screen for the consumer to reposition the consumer mobile device.

14. The method of claim 10, further comprising receiving, by the processor from the central server computer, at least one of instructions concerning further NFC testing procedures and a message for display on the display screen instructing the user to reposition the consumer mobile device.

15. The method of claim 1, further comprising, prior to receiving input from the consumer to initialize the NFC test application:

storing, by the processor in a storage device of the consumer mobile device, NFC usage data and background data associated with NFC circuitry performance over time; and transmitting, by the processor to the central server computer on a periodic basis, the NFC usage data and background data.

16. The method of claim 15, further comprising:

receiving, by the processor, an indication of a reduction in NFC circuitry performance; and displaying, by the processor on the display screen, at least one message.

17. The method of claim 16, wherein the at least one message comprises at least one of instructions to initialize the NFC test application, visit a website for information, and contact a customer service representative.

18. A non-transitory computer readable medium storing instructions configured to cause a consumer mobile device processor to:

receive input to initialize a near-field communication (NFC) test application;

display a prompt on a display screen to position the consumer's mobile device to communicate with an NFC-enabled device;

receive input indicating that the consumer's mobile device is in a communication position;

exchange a shared identity with the NFC-enabled device;

transmit the shared identity to a central server computer;

receive a plurality of NFC test instructions from the central server computer;

communicate in a transaction mode of operation with the NFC-enabled device according to the NFC test instructions;

communicate in a terminal mode of operation with the NFC-enabled device according to the NFC test instructions; and transmit NFC test data to the central server computer.

19. The non-transitory computer readable medium of claim 18, further comprising instructions configured to cause the mobile device processor to:

receive NFC test results from the central server computer; and display an indication to the consumer regarding the NFC test results on the display screen.

20. The non-transitory computer readable medium of claim 18, further comprising instructions configured to cause the mobile device processor to:

receive a failure indication associated with failure of at least one of NFC circuitry and payment software of the consumer's mobile device from the central server computer; and display a message on the display screen instructing the consumer to return the consumer's mobile device to one of a mobile device manufacturer or a mobile device supplier for repair.

21. The non-transitory computer readable medium of claim 18, further comprising, prior to the instructions for initializing the NFC test application, instructions configured to cause the mobile device processor to download an NFC test application from at least one of the central server computer and an Application Store.

22. The non-transitory computer readable medium of claim 18, further comprising, subsequent to the instructions for receiving input to initialize the NFC test application, instructions configured to cause the mobile device processor to:

retrieve NFC usage data, background data, and data indicating functionality of the NFC circuitry from a memory of the consumer's mobile device; and transmit the NFC usage data, the background data, and data indicating functionality of the NFC circuitry to the central server computer.

23. The non-transitory computer readable medium of claim 22, further comprising instructions configured to cause the mobile device processor to:

receive NFC test instructions from the central server computer for remote control of the consumer's mobile device, the NFC test instructions based on at least one of the NFC usage date, the background data, and the data indicating functionality of the NFC circuitry; and execute the NFC test instructions enabling remote control of NFC testing by the central server computer.

24. The non-transitory computer readable medium of claim 18, further comprising, prior to the instructions for displaying the prompt to position the consumer's mobile device, instructions configured to cause the mobile device processor to:

initialize an integrated camera of the consumer's mobile device;

receive visual data from the integrated camera associated with positioning of the consumer's mobile device; and transmit the visual data to the central server computer.

25. The non-transitory computer readable medium of claim 24, wherein the visual data comprises a barcode, and further comprising instructions configured to cause the mobile device processor to:

read barcode data from the barcode comprising a uniform resource locator (URL); and display a website associated with the URL on the display screen which provides further instructions for the user.

26. The non-transitory computer readable medium of claim 24, further comprising instructions configured to cause the mobile device processor to:
- receive a message from the central server computer indicating that the consumer's mobile device has been incorrectly positioned; and
- display a prompt on the display screen for the consumer to reposition the consumer mobile device.

27. The non-transitory computer readable medium of claim 24, further comprising instructions configured to cause the mobile device processor to receive at least one of instructions concerning further NFC testing procedures and a message for display on the display screen instructing the user to reposition the consumer mobile device.

28. The non-transitory computer readable medium of claim 18, further comprising, prior to the instructions for receiving input from the consumer to initialize the NFC test application, instructions configured to cause the mobile device processor to:
- store in a storage device of the consumer mobile device, NFC usage data and background data associated with NFC circuitry performance over time; and
- transmit the NFC usage data and background data to the central server computer on a periodic basis.

29. The non-transitory computer readable medium of claim 28, further comprising instructions configured to cause the mobile device processor to:
- receive an indication of a reduction in NFC circuitry performance; and
- display at least one message on the display screen comprising at least one of instructions to initialize the NFC test application, visit a website for information, and contact a customer service representative.

30. A mobile device comprising:
- a processor;
- near field communications (NFC) circuitry operably connected to the processor;
- a display operably connected to the processor; and
- a non-transitory storage device storing instructions configured to cause the processor to:
  - receive input to initialize an NFC test application;
  - display a prompt on the display screen to position the mobile device to communicate with an NFC-enabled device;
  - receive input indicating that the mobile device is in a communication position;
  - exchange a shared identity with the NFC-enabled device;
  - transmit the shared identity to a central server computer;
  - receive a plurality of NFC test instructions from the central server computer;
  - communicate in a transaction mode of operation with the NFC-enabled device according to the NFC test instructions;
  - communicate in a terminal mode of operation with the NFC-enabled device according to the NFC test instructions; and
  - transmit NFC test data to the central server computer.

\* \* \* \* \*